United States Patent
Liles

(10) Patent No.: US 9,687,098 B1
(45) Date of Patent: Jun. 27, 2017

(54) SERVER TRAY SUPPORT

(71) Applicant: Patrick Liles, Stone Mountain, GA (US)

(72) Inventor: Patrick Liles, Stone Mountain, GA (US)

(73) Assignee: Patrick L. Liles, Sr., Stone Mountain, GA (US)

(*) Notice: Subject to any disclaimer, the term of this patent is extended or adjusted under 35 U.S.C. 154(b) by 0 days.

(21) Appl. No.: 15/227,405

(22) Filed: Aug. 3, 2016

(51) Int. Cl.
*A47G 23/06* (2006.01)
*F16B 47/00* (2006.01)

(52) U.S. Cl.
CPC .......... *A47G 23/0625* (2013.01); *F16B 47/00* (2013.01)

(58) Field of Classification Search
CPC ............ A47G 23/0625; A47G 23/0633; A47G 19/065; B65D 1/34; F16B 47/00
USPC ...... 294/15, 25, 144, 172; 206/557; 220/914
See application file for complete search history.

(56) References Cited

U.S. PATENT DOCUMENTS

| | | | | |
|---|---|---|---|---|
| 3,504,832 A | * | 4/1970 | Corvetti | A47G 23/0625 206/557 |
| 5,769,264 A | * | 6/1998 | Lipkowitz | A47G 23/0625 220/23.83 |
| 6,622,885 B1 | * | 9/2003 | Erman | A47G 23/0625 220/571 |
| 8,272,512 B2 | * | 9/2012 | Joseph | A47G 23/0625 206/563 |
| 8,444,193 B2 | * | 5/2013 | Finck | B25B 11/007 294/187 |
| 8,973,796 B1 | * | 3/2015 | Abusaoud | B65D 1/34 224/218 |
| 2015/0252939 A1 | * | 9/2015 | Feng | F16B 47/00 248/143 |

FOREIGN PATENT DOCUMENTS

CA 2481251 * 3/2005

* cited by examiner

*Primary Examiner* — Dean Kramer

(57) ABSTRACT

A server tray attachment and server tray is provided. The server tray attachment includes a base having an upper surface, a lower surface opposite the upper surface, a first end and a second end opposite the first end. At least one suction cup is secured to the upper surface of the base. An arm support is secured to the lower surface near the first end. The arm support includes a first leg and a second leg sized to fit a user's arm therebetween. A handle is secured to the lower surface near the second end.

6 Claims, 3 Drawing Sheets

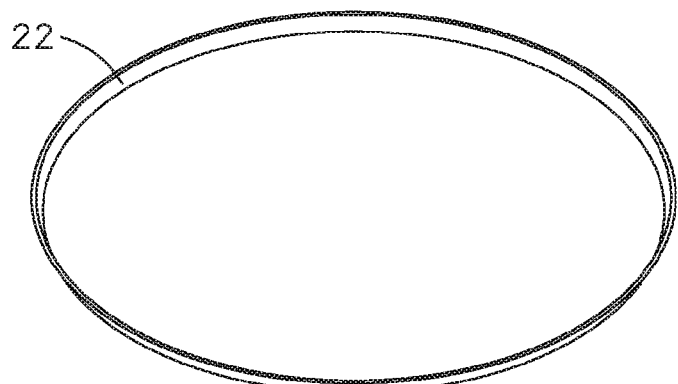
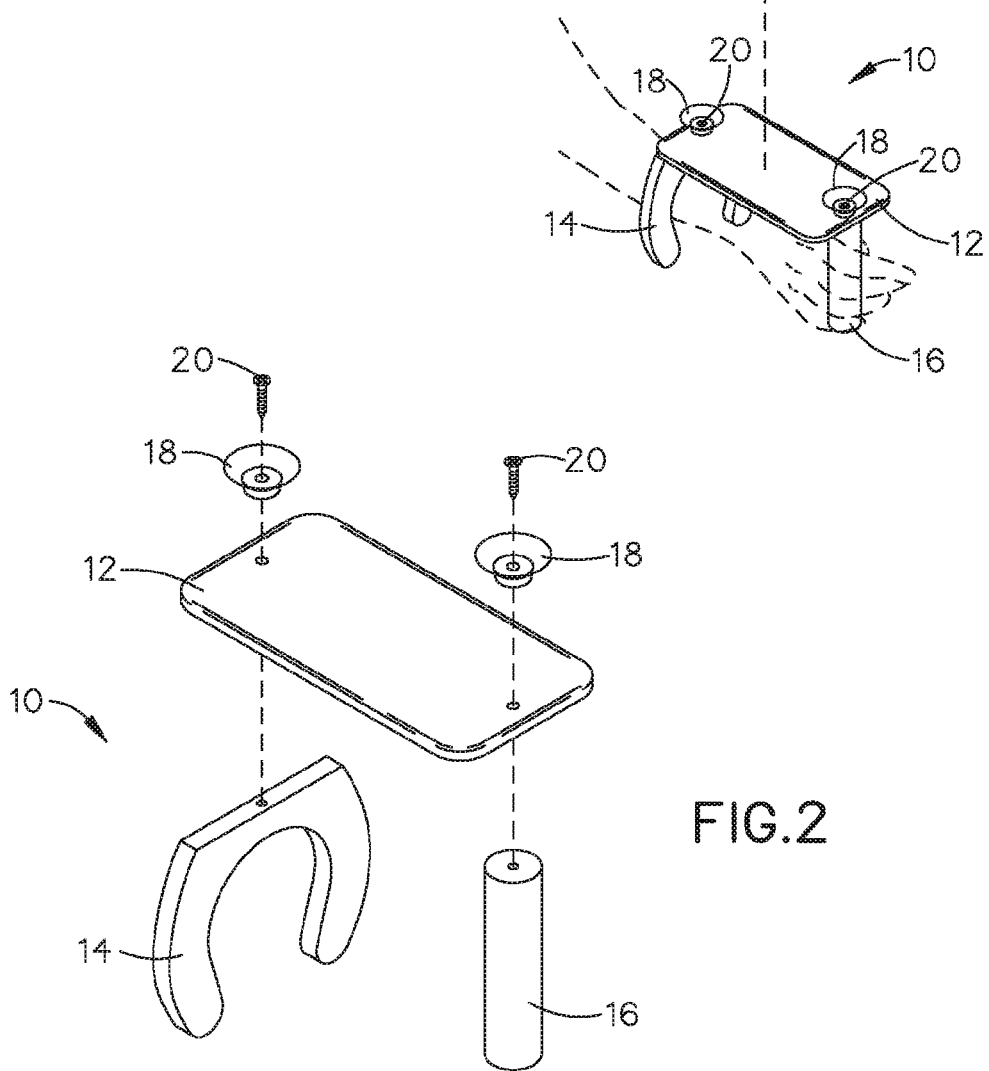

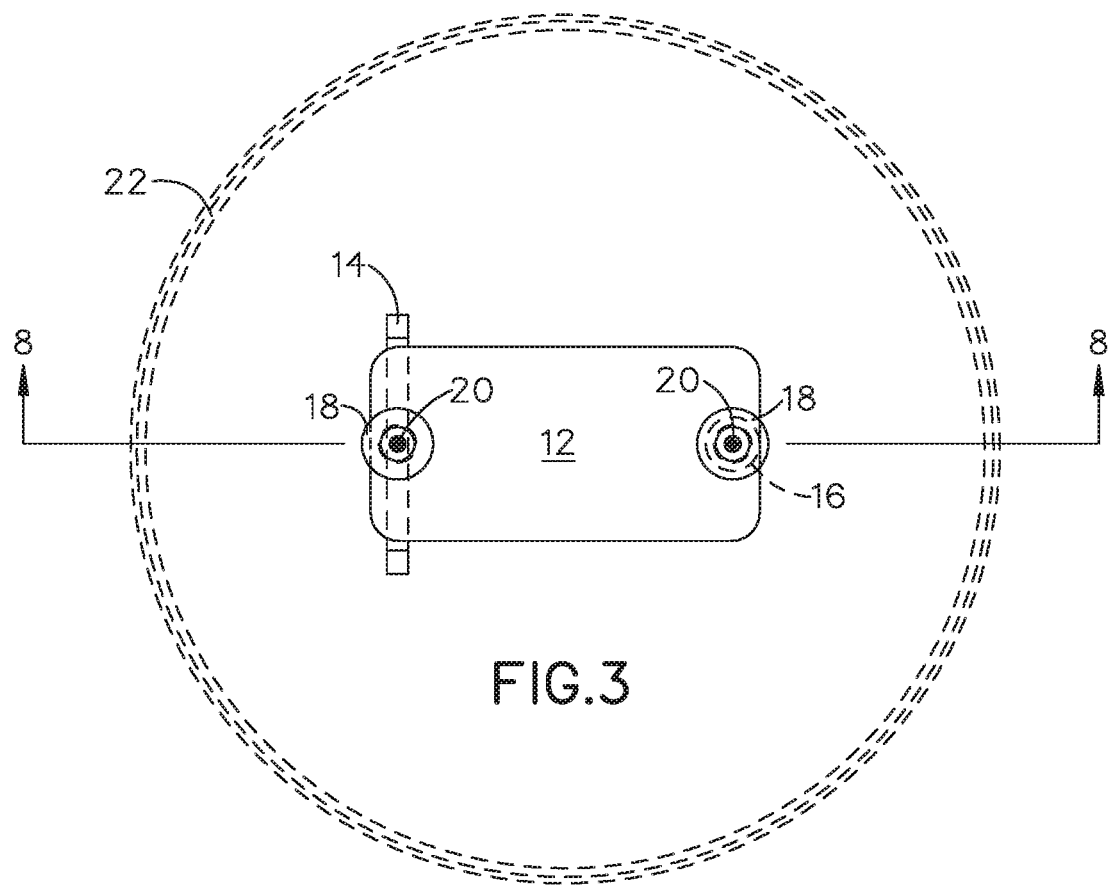
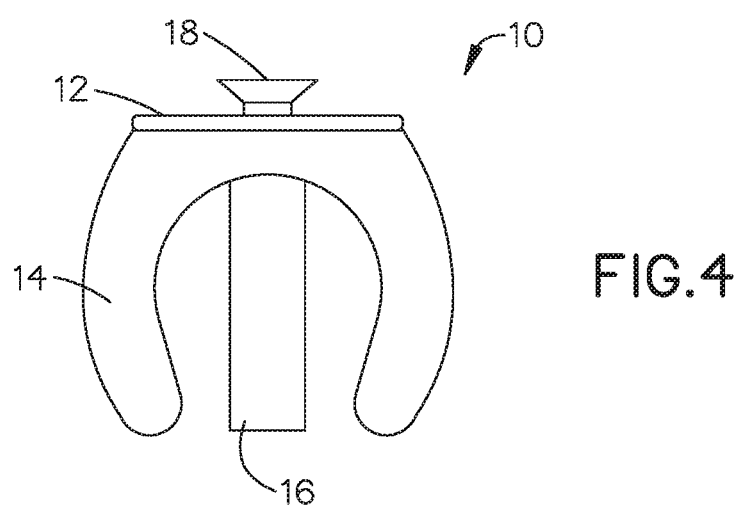

SERVER TRAY SUPPORT

BACKGROUND OF THE INVENTION

The present invention relates to server trays and, more particularly, to a server tray support.

Waiting staff are those who work at a restaurant or a bar attending customers, supplying them with food and drink as requested. An individual waiting tables is commonly called a server, waitperson, waitress (females only) or a waiter. A server or waiting staff takes on a very important role in a restaurant which is to always be attentive and accommodating to the guests. Servers typically use trays to deliver food and drink to a table. Servers must practice carrying a tray to prevent food and drink from falling. Shoulder and back pain may be induced by carrying heavy loads using the tray.

As can be seen, there is a need for a device that aids in carrying a server tray.

SUMMARY OF THE INVENTION

In one aspect of the present invention, a server tray attachment comprises: a base comprising an upper surface, a lower surface, a first end and a second end; at least one suction cup secured to the upper surface; an arm support secured to the lower surface near the first end, wherein the arm support comprises a first leg and a second leg sized to fit a user's arm therebetween; and a handle secured to the lower surface near the second end.

In another aspect of the present invention, a server tray comprises: a tray portion comprising an upper surface and a lower surface; an arm support secured to the lower surface, wherein the arm support comprises a first leg and a second leg sized to fit a user's arm therebetween; and a handle secured to the lower surface at a distance from the arm support so that a user holds the handle with a hand and a forearm of the user is disposed between the first leg and the second leg.

These and other features, aspects and advantages of the present invention will become better understood with reference to the following drawings, description and claims.

BRIEF DESCRIPTION OF THE DRAWINGS

FIG. 1 is an exploded perspective view of an embodiment of the present invention;

FIG. 2 is an exploded view of an embodiment of the present invention;

FIG. 3 is a top view of an embodiment of the present invention;

FIG. 4 is an end view of an embodiment of the present invention;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a server tray or server tray attachment that supports trays on a user's arm while serving food and drinks. The present invention allows servers to carry multiple trays to different customers in a safe and more productive manner. The present invention increases customer service through production and safety, and reduces long-term injuries that relates to the server's back and shoulders.

Figure 5:
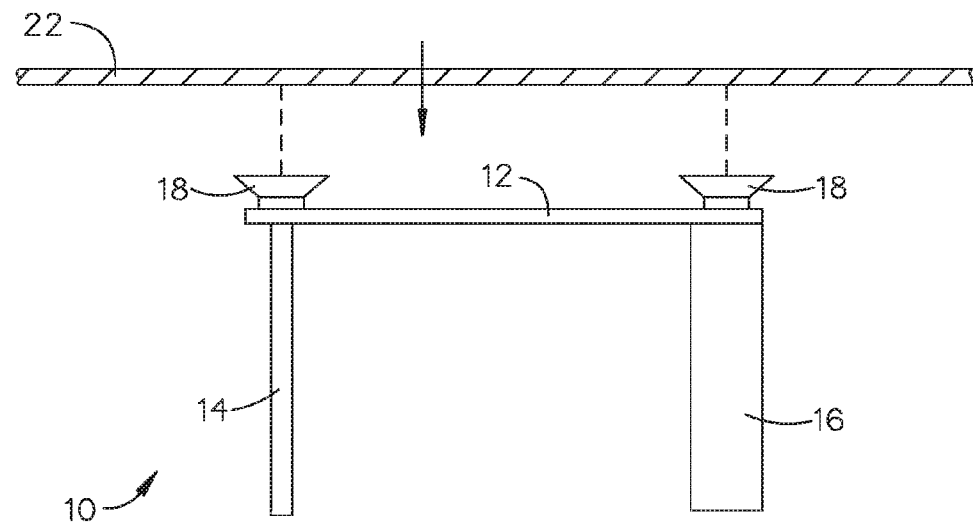
FIG. 5 is a side view of an embodiment of the present invention.
Figure 6:
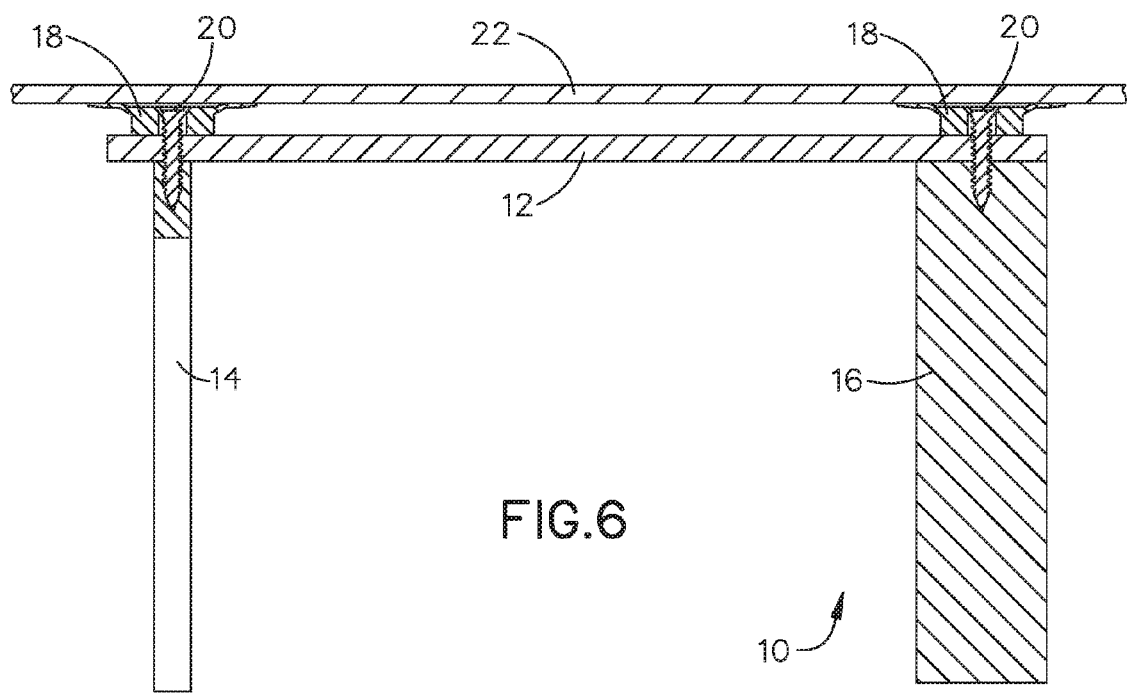
FIG. 6 is a section view of the present invention taken along line 8-8 in FIG. 3.

Referring to FIGS. 1 through 6, the present invention may include a server tray attachment 10. The server tray attachment 10 includes a base 12 having an upper surface, a lower surface opposite the upper surface, a first end and a second end opposite the first end. At least one suction cup 18 is secured to the upper surface of the base 12. An arm support 14 is secured to the lower surface near the first end. The arm support 14 includes a first leg and a second leg sized to fit a user's arm therebetween. A handle 16 is secured to the lower surface near the second end.

The base 12 of the present invention may be a flat plate having a planar upper surface and lower surface. The base 12 may further include a length and a width. The length of the base 12 may run from the first end to the second end. The length may be about 4 inches up to about 12 inches. In certain embodiments, the base 12 may include a rectangular shape with rounded edges. However, the base 12 may be other shapes, such as square or circular.

The suction cup 18 of the present invention may attach to a bottom surface of a tray 22. In certain embodiments, the present invention may utilize two or more suction cups 18. For example, a first suction cup 18 may be secured to the upper surface near the first end and a second suction cup 18 may be secured to the upper surface near the second end. The suction cups 18 may be secured to the plate by fasteners 20, such as screws, bolts and the like.

The handle 16 of the present may be a peg. The peg is a cylinder shape, allowing a user to easily grasp the peg with their hand. The peg may be secured to the base 12 by fasteners 20, such as screws, bolts and the like. For example, a first fastener 20 may run through one of the suction cups 18 through the base 12 and into the handle 16.

The first leg and the second leg of the arm support 14 may each include a curved inner edge to contour to a user's arm. In certain embodiments, the arm support 14 is a horseshoe shape. The arm support 14 may be secured to the base 12 by fasteners 20, such as screws, bolts and the like. For example, a second fastener 20 may run through the other of the suction cups 18 through the base 12 and into the arm support 14.

In certain embodiments, the present invention may include a serving tray 22 with the arm support 14 and the handle 16 directly attached. In such embodiments, the present invention includes the serving tray 22 which is disc shaped, having an upper surface and a lower surface. The arm support 14 mentioned above is secured directly to the lower surface of the tray 22. The handle 16 mentioned above is secured directly to the lower surface at a distance from the arm support 14 so that a user holds the handle 16 with a hand and a forearm of the user is disposed between the first leg and the second leg. The distance may be from about 4 inches up to about 12 inches.

An exemplary method of making the present invention may include the following. First form a flat piece of wood that measures about 9"×.025" to form the base. Form a wooden handle that measures about 5"×1.25'. Form a piece of wood cut into the shape of a horseshoe that measures about 5"×0.25". A hole is placed in the front and rear of the base. The handle and horseshoe have holes placed in the top of them as well. Two 1" screws with suction cups are inserted through the base plate. The screws are screwed into the handle and horseshoe.

It should be understood, of course, that the foregoing relates to exemplary embodiments of the invention and that modifications may be made without departing from the spirit and scope of the invention as set forth in the following claims.

What is claimed is:

1. A server tray attachment comprising:
   a base comprising an upper surface, a lower surface, a first end and a second end;
   at least one suction cup secured to the upper surface;
   an arm support secured to the lower surface near the first end, wherein the arm support comprises a first leg and a second leg sized to fit a user's arm therebetween; and
   a handle comprising a peg having a cylinder shape, wherein the handle is secured to the lower surface near the second end.

2. The server tray attachment of claim 1, wherein the upper surface is a planar surface.

3. The server tray of attachment claim 1, wherein the at least one suction cup comprises a first suction cup secured to the upper surface near the first end and a second suction cup secured to the upper surface near the second end.

4. The server tray of attachment claim 1, wherein the first leg and the second leg each comprise a curved inner edge.

5. The server tray of attachment claim 4, wherein the arm support comprises a horseshoe shape.

6. A server tray attachment comprising:
   a base comprising an upper surface, a lower surface, a first end and a second end;
   at least one suction cup secured to the upper surface;
   an arm support comprising a horseshoe shape comprising a first leg and a second leg each having a curved inner edge, wherein the arm support is secured to the lower surface near the first end; and
   a handle secured to the lower surface near the second end.

\* \* \* \* \*